(12) United States Patent
Sugita et al.

(10) Patent No.: US 9,127,110 B2
(45) Date of Patent: Sep. 8, 2015

(54) RESIN COMPOSITION, AND WIRE AND CABLE USING THE SAME

(75) Inventors: Keisuke Sugita, Hitachi (JP); Ryutaro Kikuchi, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 47 days.

(21) Appl. No.: 13/474,692

(22) Filed: May 17, 2012

(65) Prior Publication Data

US 2012/0292077 A1 Nov. 22, 2012

(30) Foreign Application Priority Data

May 20, 2011 (JP) ................. 2011-113549

(51) Int. Cl.
| | | |
|---|---|---|
| C08F 255/02 | (2006.01) | |
| C08C 19/25 | (2006.01) | |
| C08F 255/08 | (2006.01) | |
| C08J 3/24 | (2006.01) | |
| C08K 5/5415 | (2006.01) | |
| C08C 19/28 | (2006.01) | |
| C09D 123/08 | (2006.01) | |
| C08L 51/06 | (2006.01) | |
| H01B 3/44 | (2006.01) | |
| C08K 5/5425 | (2006.01) | |

(52) U.S. Cl.
CPC .............. *C08F 255/02* (2013.01); *C08C 19/25* (2013.01); *C08C 19/28* (2013.01); *C08F 255/08* (2013.01); *C08J 3/24* (2013.01); *C08K 5/5415* (2013.01); *C08L 51/06* (2013.01); *C09D 123/0815* (2013.01); *H01B 3/441* (2013.01); *C08K 5/5425* (2013.01); *C08L 2312/08* (2013.01)

(58) Field of Classification Search
CPC ....... C08C 19/25; C08C 19/28; C08F 255/02; C08F 255/08; C08K 5/5425; C08K 5/5415; C08L 51/06; C08L 2312/08; C08J 3/24; H01B 3/441

USPC ....... 174/120 SR, 110 SR, 110 PM; 525/100, 525/102, 106, 244, 263, 288, 298, 342, 387
See application file for complete search history.

(56) References Cited

U.S. PATENT DOCUMENTS 4,509,821 A * 4/1985 Stenger .................... 385/101
2010/0163272 A1* 7/2010 Inagaki et al. ........ 174/110 SR

FOREIGN PATENT DOCUMENTS

| JP | 05-002919 A1 | 1/1993 |
| WO | WO 2009/008537 A | 1/2009 |
| WO | WO 2011/034833 A2 * | 3/2011 |

OTHER PUBLICATIONS

"Comprehensive Guide to Splicing Speaker Wire," http://www.hometheatershack.com/forums/remotes-cables-accessories-tweaks/5808-comprehensive-guide-splicing-speaker-wire.html, pp. 1-7, Aug. 2007.*
"How to Use Electrical Wire Connectors," http://www.madawaart.com/diy-home-improvement/how-to-use-electrical-wire-connectors.htm, pp. 1-4, Jan. 2009.*
Japanese Office Action dated Nov. 12, 2013 with English translation thereof.

* cited by examiner

*Primary Examiner* — Roberto Rabago
(74) *Attorney, Agent, or Firm* — McGinn IP Law Group, PLLC

(57) ABSTRACT

A resin composition includes a silane-crosslinked polyethylene as a main component provided by crosslinking a polyethylene in the presence of a silanol condensation catalyst and water, the polyethylene being graft-copolymerized with a silane compound by a free radical generating agent. The polyethylene has a density of 0.87 to 0.91 g/cm3. The silane compound is included not less than 2 parts by mass relative to 100 parts by mass of the polyethylene. The resin composition includes silicon detected by a fluorescence X-ray at a rate of not less than 0.3 mass % and has a gel fraction of not less than 70%. A mass ratio of the silane compound to the free radical generating agent is not less than 35 and not more than 150.

10 Claims, 1 Drawing Sheet

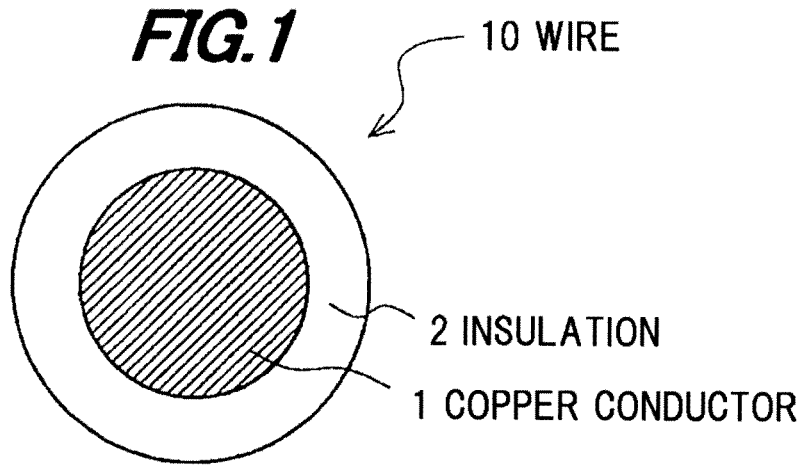
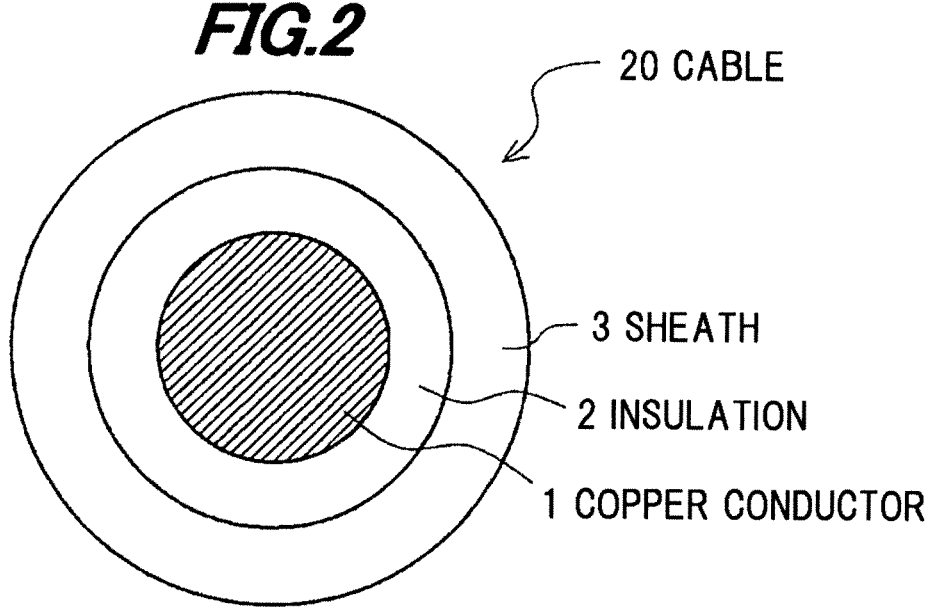

RESIN COMPOSITION, AND WIRE AND CABLE USING THE SAME

The present application is based on Japanese patent application No. 2011-113549 tiled on May 20, 2011, the entire contents of which are incorporated herein by reference.

BACKGROUND OF THE INVENTION

1. Field of the Invention

This invention relates to a resin composition that has a high degree of cross-linking, an excellent cross-linking speed at normal temperature, and a flat and smooth extrusion appearance. This invention also relates to a wire and a cable using the resin composition.

2. Description of the Related Art

Polyethylene is excellent in an electrical insulation property, thus it is widely used as a coating material of a wire and a cable. In particular, a cross-linked polyethylene obtained by that a cross-linking structure is introduced into polyethylene can be provided with a heat resistance property, so that it is widely used for a coating material of a power cable or the like.

A main cross-linking method of polyethylene includes an organic peroxide cross-linking, an electron beam irradiation cross-linking and a silane cross-linking. In the silane cross-linking, a polyethylene that is graft-copolymerized with a silane compound is formed into a shape and then it is left in a high temperature and a high humidity environment in which water exists, thereby the cross-linking is progressed.

A wire and a cable using the silane cross-linked polyethylene are generally manufactured as follows. First, for the purpose of graft-copolymerizing a silane compound with a polyethylene, a polyethylene, a silane compound, and a free radical generating agent are kneaded so as to react with each other. Next, a silanol condensation catalyst is added thereto, and then the reactant is extruded and coated on a conductor formed of copper or a cable core.

A method for carrying out the above-mentioned process includes a method that has a process in which a polyethylene graft-copolymerized with a silane compound is fabricated, and separately from the aforementioned step, a silanol condensation catalyst and the polyethylene are kneaded so as to be extruded and coated, and a method that has a process in which all the kneading steps are carried out by one extruder and then the reactance is extruded and coated.

According to globalization of market in recent years, a movement toward matching domestic standards with international standards is activated. Even in a low-tension power cable field, JIS (Japanese Industrial Standards) matched to IEC (International Electrotechnical Commission U.S., Inc.) Standard are established, and it is necessary for a resin composition used as an insulation to pass a hot set test at the test condition that an air temperature is 200 degrees C.

The hot set test is a test for measuring the degree of easily changing in shape of an insulation at a high temperature, and even in case of polyethylene that could be used in the past, if it has a low degree of cross-linking, it is easily changed in shape, so that it cannot pass the test. Therefore, it becomes necessary to develop a resin composition including a silane-crosslinked polyethylene that has a higher degree of cross-linking as a main component.

SUMMARY OF THE INVENTION

However, if an additive amount of the silane compound or the free radical generating agent is increased for the purpose of increasing the degree of cross-linking of the silane cross-linked polyethylene, a problem is caused that a foam formation, a roughened surface and a granular pattern are generated on the appearance of extrudate at the extrusion molding. Consequently, it may have been difficult to enhance a degree of crosslinking of the silane-crosslinked polyethylene used for a coating material of the wire and cable.

On the other hand, a technique is reported that a polyethylene having a low density is used, thereby absorption of water can be accelerated, so that a high degree of crosslinking such as a gel fraction of 80% can be realized (for example, refer to This is excellent in being capable of realizing a high degree of crosslinking, and simultaneously in being capable of crosslinking in a relatively short time even in such a condition that the electrical insulated wire is left in the atmosphere, in addition, the technique relates to a method in which the crosslinking is carried out by leaving the wire in the atmosphere, thus it has a merit that the initial facility investment can be relatively reduced in comparison with a method in which the crosslinking is carried out in a high temperature and a high humidity environment, however, there is a problem that a wire and a cable cannot be obtained that has an extrusion appearance of which surface is flat and smooth.

Accordingly, it is an object of the invention to provide a resin composition that has a high degree of crosslinking, an excellent crosslinking speed at normal temperature, and an extrusion appearance of which surface is flat and smooth, as well as a wire and a cable using the resin composition.

(1) According to one embodiment of the invention, a resin composition comprises:

a silane-crosslinked polyethylene as a main component provided by crosslinking a polyethylene in the presence of a silanol condensation catalyst and water, the polyethylene being graft-copolymerized with a silane compound by a free radical generating agent, wherein the polyethylene has a density of 0.87 to 0.91 g/cm3, wherein the silane compound is included not less than 2 parts by mass relative to 100 parts by mass of the polyethylene, wherein the resin composition includes silicon detected by a fluorescence X-ray at a rate of not less than 0.3 mass % and has a gel fraction of not less than 70%, and wherein a mass ratio of the silane compound to the free radical generating agent is not less than 35 and not more than 150.

In the above embodiment (1) of the invention, the following modifications and changes can be made.

(i) In a hot set test according to JIS C 3660-2-1-9, the resin composition exhibits an elongation at a loaded condition of not more than 175% and a permanent elongation after cooling of not more than 15%, where the hot set test is conducted such that an air temperature is 200 degrees C., a load is 20 N/cm2 and a time for applying the load is 15 minutes.

(2) According to another embodiment of the invention, a wire comprises:

a covering material comprising the resin composition according to the embodiment (1).

(3) According to another embodiment of the invention, a cable comprises:

a covering material comprising the resin composition according to the embodiment (1).

EFFECTS OF THE INVENTION

According to one embodiment of the invention, a resin composition can be provided that has a high degree of crosslinking, an excellent crosslinking speed at normal temperature, and an extrusion appearance of which surface is flat and smooth, as well as a wire and a cable using the resin composition.

BRIEF DESCRIPTION OF THE DRAWINGS

The preferred embodiments according to the invention will be explained below referring to the drawings, wherein:

FIG. 1 is a cross-sectional view schematically showing a wire to which a resin composition according to an embodiment of the invention is applied; and FIG. 2 is a cross-sectional view schematically showing a cable to which a resin composition according to an embodiment of the invention is applied.

DETAILED DESCRIPTION OF THE PREFERRED EMBODIMENTS

The preferred embodiments according to the invention will be explained below referring to the drawings.

First, a wire and a cable on which a resin composition according to an embodiment of the invention is coated or covered will be explained referring to FIGS. 1 and 2.

FIG. 1 shows a wire 10 that includes a copper conductor 1 and an insulation 2 coated on the copper conductor 1, the insulation 2 being formed of a resin composition according to the embodiment, and FIG. 2 shows a cable 20 that includes the wire 10 and a sheath 3 covered on the wire 10, the sheath 3 being formed of the resin composition according to the embodiment. The insulation 2 and the sheath 3 formed of the resin composition are coated or covered by an extrusion molding.

The resin composition according to the embodiment of the invention includes a silane-crosslinked polyethylene as a main component that is obtained by crosslinking a polyethylene in the presence of a silanol condensation catalyst and water, the polyethylene being graft-copolymerized with a silane compound by a free radical generating agent.

In the invention, in order to achieve the above-mentioned object, the type of polyethylene and the additive amount of the silane compound and the free radical generating agent have been deeply investigated.

In a reaction of graft-copolymerizing a silane compound with a polyethylene, first a free radical generating agent is decomposed by heat so as to generate a free radical. The free radical draws hydrogen from the polyethylene so that a polymer radical is generated. A silane compound is added to the polymer radical, thereby a polyethylene graft-copolymerized with the silane compound can be obtained.

However, in fact, there is no case that all of the silane compounds supplied are graft-copolymerized, but the silane compounds are polymerized with each other or remain unreacted. Consequently, for the purpose of enhancing the degree of crosslinking, if the additive amount of the silane compound is increased too much, a problem is caused that polymers due to polymerization between the silane compounds are grown so as to roughen the appearance as a granular pattern, and unreacted components are volatilized at a discharge opening of an extruder so as to form a foam.

In addition, for the purpose of increasing the reactive component, if the additive amount of the free radical generating agent is increased, a bond between the polymer radicals is generated in great quantities. The molecular weight of polyethylene is heightened, and further it is crosslinked so as to form a three-dimensional cross-bridging structure. As a result, a roughened surface and a granular pattern are generated on the appearance of extrudate at the extrusion molding.

Accordingly, in order to obtain a resin composition having a high degree of crosslinking and an excellent extrusion appearance, it was important that a great deal of silane compound is effectively graft-copolymerized, and simultaneously a bond between polymer radicals is inhibited.

In contrast with this, the inventors et al. have had a knowledge that even if the additive amount of the silane compound and the free radical generating agent is increased in order to obtain a h h degree of crosslinking, the mass ratio between the silane compound and the free radical generating agent is controlled in a range of 35 to 150, thereby an appearance defect such as a foam formation, a roughened surface, a granular pattern can be prevented from being generated at the extrusion molding. This is assumed to be due to the fact that the polymer radical generated by the free radical generating agent preferentially reacts with the silane compound added in large excess, thereby the polyethylene can be prevented from being heightened in the molecular weight and being crosslinked, thus the extrusion property is prevented from being lowered.

In addition, it has been found that a polyethylene of which density is 0.87 to 0.91 $g/cm^3$ is used, thereby the graft-copolymerization of the silane compound is effectively progressed, and that the content ratio of silicon detected by fluorescence X-ray is controlled in a range of not less than 0.3% and the gel fraction is controlled in a range of not less than 70%, thereby a resin composition that has a high degree of crosslinking, an excellent crosslinking speed at normal temperature and an extrusion appearance of which surface is flat and smooth can be obtained, so that the present invention can be achieved.

The above is assumed to be due to the fact that the lower a polyethylene is in density, the more it has branch structures, and the number of tertiary hydrogen is increased. Namely, the tertiary hydrogen has a property of being easily drawn, thus the more the tertiary hydrogen is contained, the more effectively the polymer radical is generated, so as to preferentially react with the silane compound added in large excess, consequently, the graft-copolymerization is effectively progressed. More silane compound is graft-copolymerized, thus the degree of crosslinking is inevitably enhanced, and a probability that reaction points meet with each other becomes high, thus the crosslinking speed is accelerated.

As the polyethylene specified in the embodiment, a polyethylene having a density of 0.87 to 0.91 $g/cm^3$ can be used. Generally, the polyethylene like this is manufactured by copolymerizing ethylene and α-olefin. As the α-olefin, propylene, 1-butene, 4-methyl-1-pentene, 1-hexene, 1-octene, or the like can be used, and it is manufactured either alone or in combination. In the invention, the polyethylene can be used either alone or by blending two or more. The melt-index (MI) thereof is not particularly limited.

If the density of the polyethylene more than 0.91 $g/cm^3$, the silane compound is not efficiently graft-copolymerized and the degree of crosslinking is lowered. For the purpose of enhancing the degree of crosslinking, if the additive amount of the silane compound and the free radical generating agent is increased, the appearance at the extrusion molding is deteriorated. If the density of the polyethylene is less than 0.87 $g/cm^3$, the mechanical strength is reduced.

In the resin composition according to the embodiment, the content ratio of silicon detected by fluorescence X-ray is controlled in a range of not less than 0.3%. The content ratio of silicon represents an amount of the silane compound that is graft-copolymerized with polyethylene. The higher the content ratio of silicon is, the higher the high degree of crosslinking and the high crosslinking speed obtained are, thus the upper limit is not specified. On the other hand, if the content ratio of silicon is less than 0.3%, the crosslinking speed is low and a sufficient degree of crosslinking is not obtained, thus the properties required by IEC Standards are not satisfied.

In addition, in the resin composition according to the embodiment, the gel fraction is controlled in a range of not less than 70%. The higher the gel fraction is, the better the result of the hot set test becomes, thus the upper limit is not specified. If the gel fraction is less than 70%, the degree of crosslinking is low, thus the properties required by IEC Standards are not satisfied.

In the silane-crosslinked polyethylene, an uncrosslinked polymer with which the silane compound is not graft-copolymerized can be also added to the extent of not damaging an intended performance. As the polymer like this, other than the above-mentioned polyethylene, polypropylene, ethylene-vinyl acetate copolymer, and ethylene-ethyl acrylate copolymer can be used, and it is not particularly limited.

The silane compound specified in the embodiment of the invention is needed to have both a group capable of reacting with the polymer and an alkoxy group capable of forming crosslinking by silanol condensation, in particular, the silane compound includes a vinylsilane compound such as vinyltrimethoxysilane, vinyltriethoxysilane, vinyltris(β-methoxyethoxy)silane; an aminosilane compound such as γ-aminopropyltrimethoxysilane, γ-aminopropyltriethoxysilane, N-β-(aminoethyl)γ-aminopropyltrimethoxysilane, β-(aminoethyl)γ-aminopropylmethyldimethoxysilane, N-phenyl-γ-aminopropyltrimethoxysilane; an epoxysilane compound such as β-(3,4epoxycyclohexyl)ethyltrimethoxysilane, γ-glycidoxypropyltrimethoxysilane, γ-glycidoxypropylmethyldiethoxysilane; a acrylsilane compound such as γ-methacryloxypropyltrimethoxysilane; a polysulfidesilane compound such as bis(3-(triethoxysilyl)propyl)tetrasulfide; a mercaptosilane compound such as 3-mercaptopropyltrimethoxysilane, 3-mercaptopropyltriethoxysilane.

The mass ratio between the above-mentioned silane compound and the free radical generating agent is not less than 35 and not more than 150. The mass ratio is calculated by a formula (a)/(b) when the additive amount of the silane compound is defined as (a) and the additive amount of the free radical generating agent is defined as (b). If the value of the mass ratio is less than 35, the degree of the heightened molecular weight in polyethylene is progressed, so that a roughened appearance at the extrusion molding is caused. If the value of the mass ratio is more than 150, the appearance and characteristics of the extrudate is lowered by polymerization between the silane compounds and foam formation due to volatilization of unreacted silane compound.

The silane compound content is controlled in a range of not less than 2 parts by mass relative to 100 parts by mass of polyethylene as a base polymer. This means that since the silane compound content in the conventional silane-crosslinked polyethylene is approximately not less than 0.5 parts by mass and less than 2 parts by mass relative to 100 parts by mass of polyethylene as a base polymer, the silane compound content used in the invention is increased in comparison with the conventional silane compound content. In addition, it is preferable that the silane compound content is not more than 10 parts by mass relative to 100 parts by mass of polyethylene as a base polymer.

As the free radical generating agent, an organic peroxide that is decomposed by heat so as to generate a free radical is mainly used, such as dicumyl peroxide, benzyl peroxide, 1,1-bis(t-butylperoxy)-3,3,5-trimethylcyclohexane, t-butylperoxyisopropyl carbonate, t-butylperoxy benzoate, 2,5-dimethyl-2,5-bis(t-benzoylperoxy)hexane, methyletylketone peroxide, 2,2-bis(t-butylperoxy)butane, cumene hydroperoxide.

It is preferable that the free radical generating agent content is controlled in a range of not less than 0.015 part by mass and not more than 0.2 part by mass relative to 100 parts by mass of polyethylene as a base polymer.

The silanol condensation catalyst that can be used in the embodiment includes dibutyltin dilaurate, dioctyltin dilaurate, dibutyltin diacetate, dioctyltin diacetate, dibutyltin dioctate, dioctyltin dioctate, tin(II) acetate, tin(II) caprylate, zinc caprylate, zinc naphthenate, and cobalt naphthenate. In addition, for the purpose of enhancing condensation efficiency, acids such as a carboxylic compound, a sulfonic compound, and alkalis such as an amine compound can be also used, and these compounds can be also used together with the above-mentioned tin compound and zinc compound or the like. It is preferable that the silanol condensation catalyst content is controlled in a range of 0.001 to 1.0 part by mass relative to 100 parts by mass of polyethylene, depending on the kind of catalyst.

The adding method includes, other than a method of adding the catalyst directly, a method of using a master batch in which the catalyst is preliminarily mixed into a crystalline polyolefin resin such as polyethylene.

As necessary, other than the above-mentioned components, within a range of not inhibiting the effect of the invention, it is also possible to add additives such as a process oil, a processing aid, a flame retardant, a flame retardant aid, a cross-linking agent, a cross-linking agent aid, an antioxidant, an ultraviolet absorber, a copper inhibitor, a lubricating agent, an inorganic filler, a compatibilizing agent, a stabilizer, carbon black, a colorant.

It is preferable that the resin composition has the elongation at the loaded condition is not more than 175% and the permanent elongation after cooling is not more than 15% at the test condition that an air temperature is 200 degrees C. a load is 20 N/cm$^2$ and a time for applying the load is 15 minutes in a hot set test shown in JIS C 3660-2-1-9.

As mentioned above, in short, according to the invention, a resin composition that has a high degree of crosslinking, an excellent crosslinking speed at normal temperature, and an extrusion appearance of which surface is flat and smooth can be obtained.

Three steps (1) to (3) are needed for manufacturing the resin composition according to the invention, namely step (1) of graft-copolymerizing a silane compound with a polyethylene, step (2) of kneading the polyethylene graft-copolymerized with the silane compound and a silanol condensation catalyst and carrying out an extrusion coating in order to form the insulation 2 of the wire 10 and step (3) of putting the wire 10 in the presence of water so as to accelerate the crosslinking of polyethylene. Various methods can be used for carrying out the steps (1) to (3), for example, a method of carrying out the steps (1) and (2) in one extrusion by using a single screw extruder or the like can be used, and a method of carrying out the steps (1) and (2) separately from each other can be also used, the step (1) being carried out by using a single-screw extruder, a twin-screws extruder, a kneader, a Banbury type mixer, a roll or the like, and the step (2) being carried out by a single-screw extruder, and the method is not limited to a particular method. A compounding agent such as an antioxidant, a colorant can be added at any time. A method of carrying out the step (3) includes, for example, a method of leaving the wire 10 in a high humidity environment at normal temperature or by heating at a temperature below the melting point of polyethylene.

Further, in the embodiment, a case that the resin composition is used for the wire 10 has been explained, but the resin composition can be also used as the sheath 3 of the cable 20. Also in this case, the resin composition can be covered by using the same steps as the above-mentioned steps.

The wire and cable using the resin composition according to the embodiment can be prevented from being changed in shape of the coating or covering material such as the insulation 2 and the sheath 3 at a high temperature, since the coating or covering material has a high degree of crosslinking.

EXAMPLES

Examples 1 to 6 of the invention and Comparative Examples 1 to 7 will be explained below.

In Examples 1 to 6 and Comparative Examples 1 to 7, a resin composition including a silane-crosslinked polyethylene as a main component was manufactured. Two steps were carried out separately from each other, namely a step of graft-copolymerizing a silane compound with a polyethylene, and a step of kneading the polyethylene graft-copolymerized with the silane compound and a silanol condensation catalyst so as to apply an extrusion coating to a copper conductor were carried out separately from each other.

First, in the step of graft-copolymerizing a silane compound with a polyethylene, a single-screw extruder with a screw diameter of 40 mm (L/D=24) was used, polyethylene was supplied through a hopper, and a solution with dicumyl peroxide dissolved in vinyltrimethoxysilane was supplied through a chemical feed pump, so that the polyethylene graft-copolymerized with the silane compound was manufactured. The cylinder temperature was set to be 200 degrees C., and the extrusion was carried out such that residence time in the extruder was 2 to 3 minutes.

Subsequently, in the step of kneading the polyethylene graft-copolymerized with the silane compound and the silanol condensation catalyst, and applying the extrusion coating to the copper conductor, a single-screw extruder with a screw diameter of 40 mm (L/D=24) was used, and the polyethylene graft-copolymerized with the silane compound preliminarily blended at the ratio shown in Table 1, a master batch including the silanol condensation catalyst were supplied from a hopper, and the extrusion coating was applied to the copper conductor having a diameter of 7.3 mm so as to be 1.2 mm thick, so that a wire was manufactured. The cylinder temperature was set to 180 degrees C., and the extrusion was carried out such that residence time in the extruder was 2 to 3 minutes.

The wire manufactured was left in a normal temperature environment (23 degrees C., 50% RH) for four days, so as to be crosslinked.

The wire manufactured by the above-mentioned procedure was evaluated by the following methods.

Fluorescence X-Ray Analysis

A sample from which the copper conductor was eliminated, and that was dried in a vacuum at 60 degrees C. for 24 hours for the purpose of removing an unreacted silane compound was used, and an element analysis was carried out by an X-ray fluorescence spectrometer (manufactured by Rigaku Corporation). The sample having a content ratio of silicon of not less than 0.3% was evaluated as acceptable, the content ratio of silicon representing an amount of the silane compound graft-copolymerized with polyethylene.

Gel Fraction

The copper conductor was eliminated, and an extraction was carried out in hot xylene of 130 degrees C. in temperature for 24 hours. The gel fraction was defined by the following formula. The sample having a gel fraction of not less than 70% was evaluated as acceptable.

(mass of gel remaining after extraction)/(mass of resin composition before extraction)×100(%)

Hot Set Test

The copper conductor was eliminated, the inner side of the coating or covering material was ground so as to be flat and smooth, and a hot set test according to JIS (Japanese Industrial Standards) C 3660-1-1-9 was carried out. A sample having a dumbbell shape was hung in a constant temperature bath of 200 degrees C. in temperature, a load of 20 N/cm$^2$ was applied for 15 minutes and an elongation at the loaded condition was measured. After that, the load was removed, after a lapse of 5 minutes, the sample was taken out and sufficiently cooled, and then the permanent elongation was measured. The sample having an elongation of not more than 175% at the loading condition and the permanent elongation of not more than 15% after cooling was evaluated as acceptable.

Tensile Test

The copper conductor was eliminated, the inner side of the coating or covering material was ground so as to be flat and smooth, and a tensile test in accordance with JIS C 3660-1-1-9 was carried out. The sample having a tensile strength of not less than 12.5 MPa was evaluated as acceptable.

Extrusion Appearance

Flatness and smoothness of the surface, and existence or non-existence of a granular pattern and a foam formation were evaluated by visual contact and hand feeling. The sample that has a sufficiently flat and smooth surface and in which the granular pattern or the foam formation was not observed was evaluated as good, and the sample that has a roughened surface and in which the granular pattern or the foam formation was observed was evaluated as no good.

TABLE 1

| | | | | Examples | | | | | | Comparative Examples |
|---|---|---|---|---|---|---|---|---|---|---|
| | | | Item | 1 | 2 | 3 | 4 | 5 | 6 | 1 |
| Composition | Silane compound graft copoly- merized- poly- ethylene | Poly- ethylene | Ethylene-hexene copolymer (d = 0.913 g/cm$^3$, MI = 2.0 g/10 min) | — | — | — | — | — | — | 100 |
| | | | Ethylene-hexene copolymer (d = 0.904 g/cm$^3$, MI = 2.0 g/10 min) | 100 | — | — | 100 | 100 | — | — |
| | | | Ethylene-butene copolymer (d = 0.885 g/cm$^3$, MI = 3.6 g/10 min) | — | 100 | — | — | — | 100 | — |
| | | | Ethylene-octene copolymer (d = 0.870 g/cm$^3$, MI = 5.0 g/10 min) | — | — | 100 | — | — | — | — |
| | | | Ethylene-butene copolymer (d = 0.864 g/cm$^3$, MI = 3.6 g/10 min) | — | — | — | — | — | — | — |
| | | Silane | Vinyltrimethoxysilane | 4 | 4 | 4 | 2 | 3.5 | 6 | 4 |

TABLE 1-continued

| | | | | | | | | | | |
|---|---|---|---|---|---|---|---|---|---|---|
| | | compound | | | | | | | | |
| | | Free radical generating agent | Dicumyl peroxide | | 0.04 | 0.04 | 0.04 | 0.05 | 0.1 | 0.04 | 0.04 |
| | Master batch | Polymer | Ethylene-hexene copolymer (d = 0.904 g/cm³, MI = 2.0 g/10 min) | | 4.7 | 4.7 | 4.7 | 4.7 | 4.7 | 4.7 | 4.7 |
| | | Silanol condensation catalyst | Dioctyltin dilaurate | | 0.1 | 0.1 | 0.1 | 0.1 | 0.1 | 0.1 | 0.1 |
| | | Anti-oxidant | Pentaerythritoltetrakis[3-(3,5-di-t-butyl-4-hydroxyphenyl)propionate] | | 0.1 | 0.1 | 0.1 | 0.1 | 0.1 | 0.1 | 0.1 |
| | | Copper inhibitor | 1,3benzen dicarboxylic acidbis[2-(1-oxo-2-phenoxypropyl)hydrazide] | | 0.1 | 0.1 | 0.1 | 0.1 | 0.1 | 0.1 | 0.1 |
| Characteristics | Mass ratio (silane compound (a)/ free radical generating agent (b)) | | | not less than 35 and not more than 150 | 100 | 100 | 100 | 40 | 35 | 150 | 100 |
| | Fluorescence X-ray analysis Content ratio of silicon (%) | | | not less than 0.3 | 0.34 | 0.51 | 0.66 | 0.30 | 0.49 | 0.79 | 0.28 |
| | Gel fraction (%) | | | not less than 70 | 73 | 77 | 78 | 70 | 80 | 85 | 67 |
| | Hot set test | Elongation at loaded condition (%) | | not more than 175 | 84 | 56 | 50 | 162 | 60 | 25 | 210 |
| | | Permanent elongation (%) | | not more than 15 | 11 | 8 | 7 | 13 | 5 | 1 | 22 |
| | Tensile test | Tensile strength (MPa) | | not less than 12.5 | 31 | 20 | 17 | 30 | 31 | 22 | 34 |
| | Extrusion appearance | | | Good | G* | G | G | G | G | G | G |

| | | | | Comparative Examples | | | | | | |
|---|---|---|---|---|---|---|---|---|---|---|
| | | | Item | | 2 | 3 | 4 | 5 | 6 | 7 |
| Composition | Silane compound graft copolymerized-polyethylene | Polyethylene | Ethylene-hexene copolymer (d = 0.913 g/cm³, MI = 2.0 g/10 min) | | 100 | 100 | — | — | — | — |
| | | | Ethylene-hexene copolymer (d = 0.904 g/cm³, MI = 2.0 g/10 min) | | — | — | — | 100 | 100 | — |
| | | | Ethylene-butene copolymer (d = 0.885 g/cm³, MI = 3.6 g/10 min) | | — | — | — | — | — | 100 |
| | | | Ethylene-octene copolymer (d = 0.870 g/cm³, MI = 5.0 g/10 min) | | — | — | — | — | — | — |
| | | | Ethylene-butene copolymer (d = 0.864 g/cm³, MI = 3.6 g/10 min) | | — | — | 100 | — | — | — |
| | | Silane compound | Vinyltrimethoxysilane | | 6 | 4 | 4 | 1.8 | 3 | 6.4 |
| | | Free radical generating agent | Dicumyl peroxide | | 0.04 | 0.06 | 0.04 | 0.05 | 0.1 | 0.04 |
| | Master batch | Polymer | Ethylene-hexene copolymer (d = 0.904 g/cm³, MI = 2.0 g/10 min) | | 4.7 | 4.7 | 4.7 | 4.7 | 4.7 | 4.7 |
| | | Silanol condensation catalyst | Dioctyltin dilaurate | | 0.1 | 0.1 | 0.1 | 0.1 | 0.1 | 0.1 |
| | | Anti-oxidant | Pentaerythritoltetrakis[3-(3,5-di-t-butyl-4-hydroxyphenyl)propionate] | | 0.1 | 0.1 | 0.1 | 0.1 | 0.1 | 0.1 |
| | | Copper inhibitor | 1,3benzen dicarboxylic acidbis[2-(1-oxo-2-phenoxypropyl)hydrazide] | | 0.1 | 0.1 | 0.1 | 0.1 | 0.1 | 0.1 |
| Characteristics | Mass ratio (silane compound (a)/ free radical generating agent (b)) | | | not less than 35 and not more than 150 | 150 | 66.7 | 100 | 36 | 30 | 160 |
| | Fluorescence X-ray analysis Content ratio of silicon (%) | | | not less than 0.3 | 0.33 | 0.30 | 0.68 | 0.28 | 0.40 | 0.82 |
| | Gel fraction (%) | | | not less than 70 | 71 | 72 | 80 | 66 | 74 | 88 |
| | Hot set test | Elongation at loaded condition (%) | | not more than 175 | 170 | 165 | 44 | 234 | 80 | 20 |
| | | Permanent elongation (%) | | not more than 15 | 14 | 13 | 2 | 24 | 6 | 0 |
| | Tensile test | Tensile strength (MPa) | | not less than 12.5 | 28 | 28 | 6 | 31 | 17 | 23 |
| | Extrusion appearance | | | Good | NG* | NG | G | G | NG | NG |

*G: good, NG: no good
(Blending unit: parts by mass)

As shown in Table 1, in Examples 1 to 6 of the invention, all of the characteristics satisfy the target value, and the extrusion appearance is good.

In Comparative Example 1, the density of is higher than the specified value, thus the silane compound is not sufficiently graft-copolymerized with polyethylene, so that the content ratio of silicon is low. Consequently, the crosslinking speed is low and the degree of crosslinking is low, thus acceptance is not obtained in the hot set test. In addition, in Comparative Examples 2, 3 in which the silane compound or the free radical generating agent is increased while polyethylene having a higher density than the specified value is used for the purpose of enhancing the degree of crosslinking, the extrusion appearance is deteriorated.

In Comparative Example 4, the density of lower than the specified value, thus the tensile strength is low.

In Comparative Example 5, the additive amount of the silane compound is low and the content ratio of silicon does not reach the specified value, thus the crosslinking speed is low, so that acceptance is not obtained in the hot set test.

In Comparative Examples 5, 6, the mass ratio between the silane compound and the free radical generating agent is not included in the specified range, thus the extrusion appearance is deteriorated.

As seen from the above, the wire and the cable using the resin composition according to the invention, the resin composition including the silane-crosslinked polyethylene as a main component, have a coating or covering material with a high degree of crosslinking, and have an excellent extrusion appearance, so that it is considered that the wire and the cable has an extremely high industrial usability.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A wire, comprising:
a conductor extrusion-coated with a covering layer, the covering layer comprising a resin composition including a silane-crosslinked polyethylene as a main component provided by crosslinking a polyethylene selected from the group consisting of an ethylene-hexene copolymer and an ethylene-octene copolymer in presence of a silanol condensation catalyst and water, the polyethylene being graft-copolymerized with a silane compound by a free radical generating agent,
wherein the polyethylene has a density of 0.87 to 0.91 g/cm$^3$,
wherein the silane compound is included not less than 2 parts by mass relative to 100 parts by mass of the polyethylene,
wherein the resin composition includes silicon detected by a fluorescence X-ray at a rate of not less than 0.3 mass % and has a gel fraction of not less than 70%,
wherein a mass ratio of the silane compound to the free radical generating agent is not less than 35 and not more than 150,
wherein Gel fraction=(mass of gel remaining after extraction)/(mass of resin composition before extraction)×100 (%), and
wherein the covering layer has a load elongation of not more than 175% and a post-cooling permanent elongation of not more than 15% in JIS (Japanese Industrial Standards) C 3660-2-1-9 hot set testing conditions of an air temperature of 200 degrees C., a load of 20 N/cm$^2$, and a load time of 15 minutes.

2. A cable, comprising:
an insulating layer coated conductor extrusion-coated with an outer peripheral sheath layer therearound, the sheath layer comprising a resin composition including a silane-crosslinked polyethylene as a main component provided by crosslinking a polyethylene selected from the group consisting of an ethylene-hexene copolymer and an ethylene-octene copolymer in presence of a silanol condensation catalyst and water, the polyethylene being graft-copolymerized with a silane compound by a free radical generating agent,
wherein the polyethylene has a density of 0.87 to 0.91 g/cm$^3$,
wherein the silane compound is included not less than 2 parts by mass relative to 100 parts by mass of the polyethylene,
wherein the resin composition includes silicon detected by a fluorescence X-ray at a rate of not less than 0.3 mass % and has a gel fraction of not less than 70%,
wherein a mass ratio of the silane compound to the free radical generating agent is not less than 35 and not more than 150,
wherein Gel fraction=(mass of gel remaining after extraction)/(mass of resin composition before extraction)×100 (%), and
wherein the sheath layer has a load elongation of not more than 175% and a post-cooling permanent elongation of not more than 15% in JIS(Japanese Industrial Standards) C 3660-2-1-9 hot set testing conditions of an air temperature of 200 degrees C., a load of 20 N/cm$^2$, and a load time of 15 minutes.

3. The wire according to claim 1, wherein the silane-crosslinked polyethylene comprises an uncrosslinked polymer with which the silane compound is not graft-copolymerized.

4. The wire according to claim 1, wherein the silane compound is included not more than 10 parts by mass relative to 100 parts by mass of the polyethylene.

5. The wire according to claim 4, wherein a content of the free radical generating agent is in a range of not less than 0.015 part by mass and not more than 0.2 part by mass relative to 100 parts by mass of the polyethylene.

6. The wire according to claim 5, wherein a content of the silanol condensation catalyst content is in a range of 0.001 to 1.0 part by mass relative to 100 parts by mass of the polyethylene.

7. The cable according to claim 2, wherein the silane-crosslinked polyethylene comprises an uncrosslinked polymer with which the silane compound is not graft-copolymerized.

8. The cable according to claim 2, wherein the silane compound is included not more than 10 parts by mass relative to 100 parts by mass of the polyethylene.

9. The cable according to claim 8, wherein a content of the free radical generating agent is in a range of not less than 0.015 part by mass and not more than 0.2 part by mass relative to 100 parts by mass of the polyethylene.

10. The cable according to claim 9, wherein a content of the silanol condensation catalyst content is in a range of 0.001 to 1.0 part by mass relative to 100 parts by mass of the polyethylene.

* * * * *